United States Patent
Meng et al.

(10) Patent No.: US 7,035,589 B1
(45) Date of Patent: Apr. 25, 2006

(54) METHOD AND SYSTEM FOR TRACKING AND MITIGATING DC OFFSET IN THE PRESENCE OF CARRIER FREQUENCY OFFSETS

(75) Inventors: Teresa H. Meng, Portola Valley, CA (US); Paul J. Husted, Palo Alto, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 592 days.

(21) Appl. No.: 10/253,003

(22) Filed: Sep. 23, 2002

Related U.S. Application Data

(60) Provisional application No. 60/324,622, filed on Sep. 24, 2001.

(51) Int. Cl.
    *H04B 1/10* (2006.01)

(52) U.S. Cl. .................. 455/63.1; 455/226.1; 455/296; 375/231; 375/326; 375/319

(58) Field of Classification Search ............. 455/226.1, 455/67.11, 67.13, 67.16, 296, 305, 504, 505, 455/506, 561, 575.1, 556.1, 306, 307, 310, 455/311, 303, 324, 422.1, 424, 425, 516, 455/52, 65, 59, 60, 61, 62, 63.1, 501, 507, 455/135; 375/244, 220, 224, 286, 320, 235, 375/319, 346, 336, 344, 285, 350, 144, 357, 375/356, 231, 326, 340, 232, 330, 353, 317, 375/229, 371, 226; 329/320, 318, 349, 353; 370/208, 203, 210, 332; 327/307, 309, 311
See application file for complete search history.

(56) References Cited

U.S. PATENT DOCUMENTS

| | | | | |
|---|---|---|---|---|
| 5,732,113 A | * | 3/1998 | Schmidl et al. | ............. 375/355 |
| 6,400,778 B1 | * | 6/2002 | Matui | ......................... 375/319 |
| 2002/0001354 A1 | * | 1/2002 | McNally | ..................... 375/317 |
| 2003/0152021 A1 | * | 8/2003 | Wang et al. | ................. 370/208 |

* cited by examiner

*Primary Examiner*—Edward F. Urban
*Assistant Examiner*—Charles Chow
(74) *Attorney, Agent, or Firm*—John W. Carpenter; Reed Smith, LLP

(57) ABSTRACT

A method and system for reducing the DC offset in a receiver in the presence of carrier frequency offset between the transmitter and the receiver. The present invention utilizes the knowledge of the carrier frequency offset to determine the phase difference between two (or more) snapshots of the same transmitted symbol. The receiver DC offset is solved for using a linear system solver which can be implemented outside the analog domain. The DC offset may be tracked in order to maintain a constant adjust of the DC offset, which in combination with the above DC offset estimation technique implements a complete solution for the DC offset cancellation problem.

15 Claims, 4 Drawing Sheets

“METHOD AND SYSTEM FOR TRACKING AND MITIGATING DC OFFSET IN THE PRESENCE OF CARRIER FREQUENCY OFFSETS

This application claims priority to U.S. Provisional Application Ser. No. 60/324,622 filed Sep. 24, 2001 entitled METHOD AND SYSTEM FOR TRACKING AND MITIGATING DC OFFSET IN THE PRESENCE OF CARRIER FREQUENCY OFFSETS, the disclosure of which is herein incorporated by reference.

BACKGROUND OF THE INVENTION

1. Field of the Invention

The present invention relates generally to the field of radio communications, and more particularly to the field of eliminating DC offset in a high frequency radio signal.

2. Description of the Related Art

In most radio communication systems, or any other system having a transmitted signal mixed with a carrier frequency, there is a carrier frequency offset between the receiver and the transmitter due to the use of different oscillators in the communicating devices. Due to imperfect matching and many other radio design trade-offs, there often exists a non-zero DC offset at the receiver. This DC offset resides precisely at the DC (frequency=0) in the received spectrum. After the transmitted signal has been down-converted to the baseband (processing frequency) in the receiver, the signal generated by the transmitter and the channel centered around the carrier frequency will be down-converted to a spectrum centered at a frequency that is equal to the carrier frequency offset between the transmitter and the receiver, denoted $f_{offset}$.

The appearance of DC offset is illustrated in FIG. 1, where the receiver DC offset appears at frequency=0 and the carrier leak from the transmitted signal appears at frequency=$f_{offset}$. The carrier leak signal is a narrow band signal transmitted at the carrier frequency, caused primarily by imperfect digital-to-analog converters (DACs), and feed-through in the mixers. It is very difficult using known techniques to eliminate the receiver DC offset in the presence of the down-converted transmitted signal.

Most available DC offset cancellation algorithms are based on low-pass filtering (LPF), notch filtering, or averaging. For example, if an accumulator is used at the receiver to accumulate samples of the received signal in the time domain, an estimate of the receiver DC offset can be obtained. The notch filter operates in a similar fashion in that it "filters" the DC component out of the received spectrum, as illustrated in FIG. 2. However, as shown in FIG. 2, the DC offset estimated from averaging or notch-filtering is not perfect, as it cannot distinguish the transmitted signal from the receiver DC offset. This may result in the loss of signal energy.

DC offset is also eliminated in the analog domain, by correcting the frequency offset first (calibrating) and then using an AC coupling circuit. However, analog solutions are generally more costly and less robust due to circuit fabrication process variations. There is therefore a need in the art for a DC offset solution that circumvents the need for filtering or analog calibration.

SUMMARY OF THE INVENTION

In general, the present invention is a method and system for reducing the DC offset in the presence of carrier frequency offset between the transmitter and the receiver. The present technique exploits the fact that the receiver DC offset is not correlated, or in frequency lock, with the transmitted signal, and therefore can be accurately extracted by taking multiple snapshots of the same symbol at the receiver.

The present invention utilizes the knowledge of the carrier frequency offset to determine the phase difference between two (or more) snapshots of the same transmitted symbol. In one embodiment, the dot product of the second symbol and the complex conjugate of the first symbol is calculated to determine the phase difference.

The present invention solves for the receiver DC offset using a linear system solver which can be implemented outside the analog domain. Specifically, for two received signals, x1 and x2, each having N time-domain samples, the DC offset may be determined by the following formula:

$$DC = \frac{x2 - x1 \times \exp(j\alpha)}{1 - \exp(j\alpha)} \bigg/ N$$

The DC offset may be tracked in order to maintain a constant adjust of the DC offset. In one embodiment, the DC offset tracking circuit uses an IIR or an FIR filter to slowly track the DC offset variation over time, which in combination with the above DC offset estimation algorithm implements a complete solution for the DC offset cancellation problem.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

DC Offset Cancellation

Figure 1:
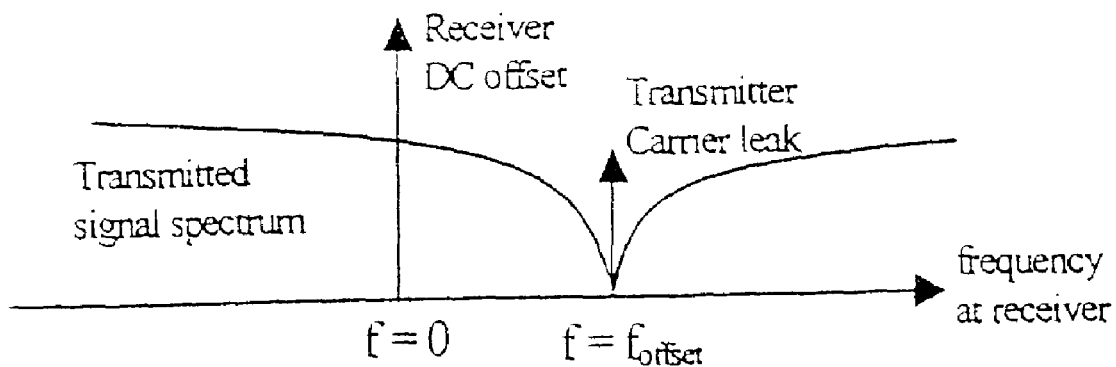
FIG. 1 illustrates a received signal spectrum with receiver DC offset and down-converted transmitted signal.
Figure 2:
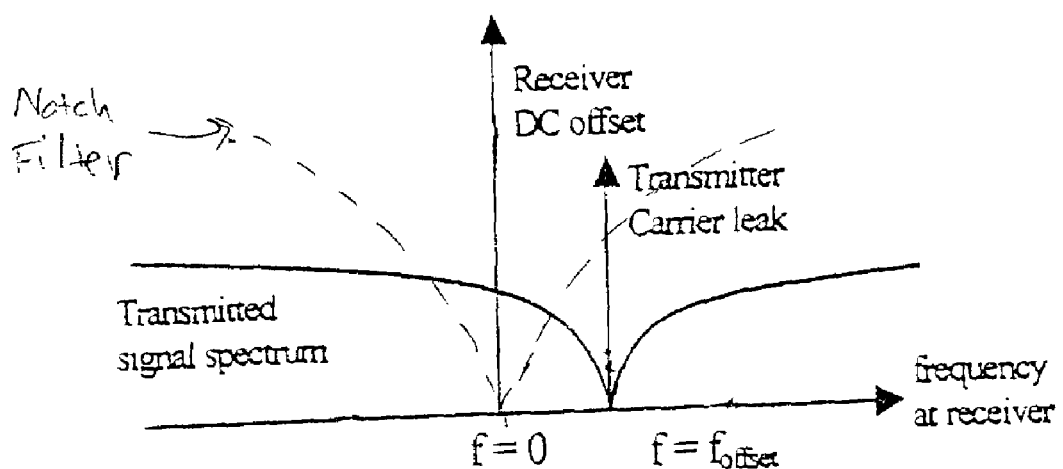
FIG. 2 illustrates how DC offset can be estimated using a notch filter.

As shown in FIG. 1, for any non-zero $f_{offset}$, the receiver DC offset would overlap with one side of the transmitted signal spectrum, depending on the sign of $f_{offset}$. The receiver DC offset can often have higher power spectrum density than that of the transmitted signal spectrum. Separating an interference signal (the receiver DC offset) from a transmitted signal spectrum in the presence of another nearby interference signal (the carrier leak) is a difficult task. As shown in FIG. 2, any filtering operation having a bandwidth larger than the carrier frequency offset would pass both the carrier leak and the DC offset, and therefore cannot be an accurate DC offset estimator. Thus, to separate the DC offset from the rest of the signal spectrum, the method of the present invention exploits the fact that the carrier leak is in frequency lock with the data carriers, while the DC offset is plainly a signal added in at the receiver.

DC Offset Estimation

In order to separate the receiver DC offset from the transmitted spectrum, two (or more) "snapshots" (i.e. accumulated data samples) of the same transmitted spectrum are taken and the DC offset is calculated using these two snapshots. This requires that the same zero-mean sequence of data (i.e. symbol) be transmitted twice, where ideally this signal has little energy near DC other than the carrier leak. In most communication protocols during the "training mode", a periodic sequence of data is usually transmitted which contains multiple copies of the same symbol.

Figure 3:
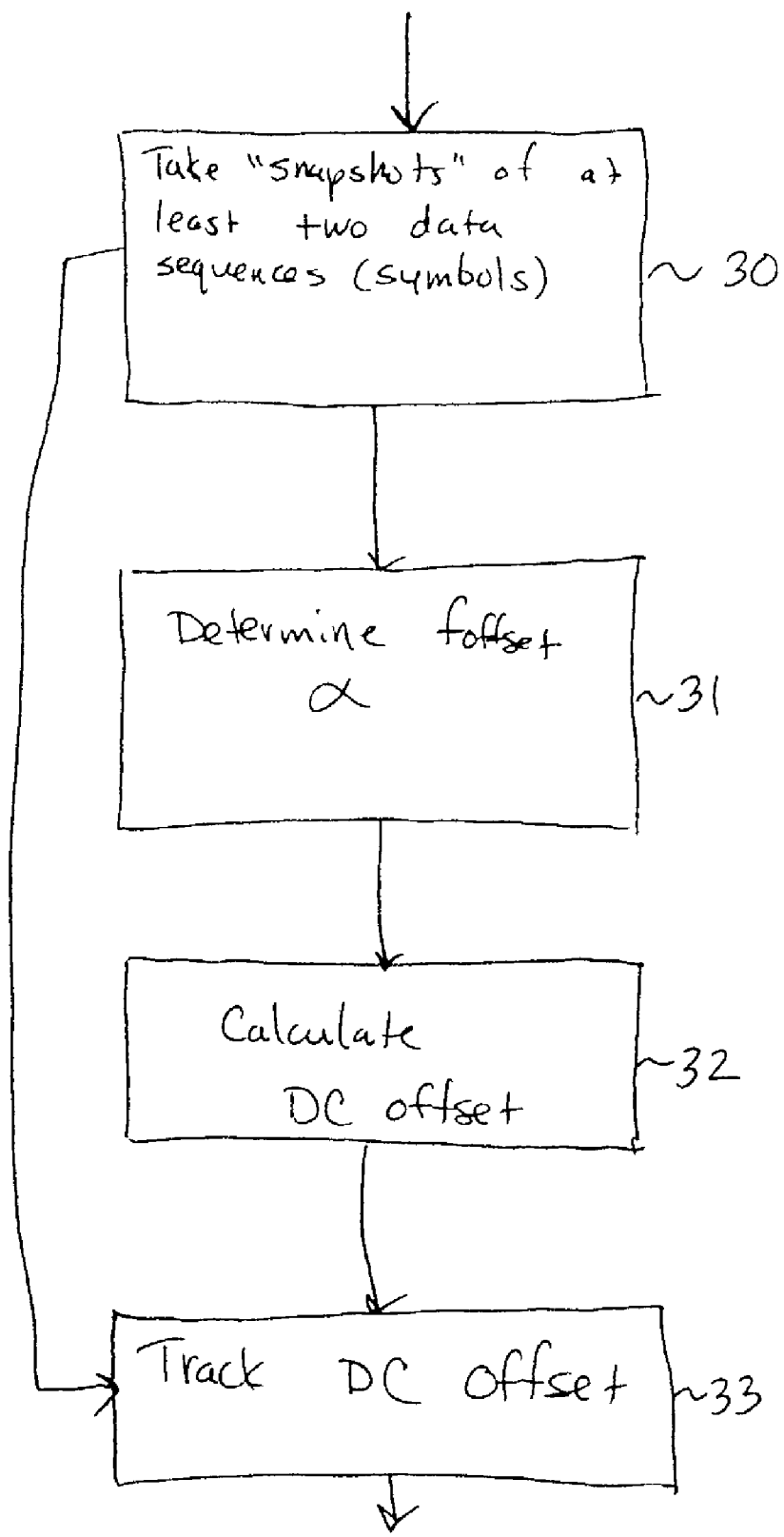
FIG. 3 is a flowchart of the operation of the present invention.

The operation of one embodiment the present invention will now be described in further detail, with reference to the flowchart of FIG. 3. First, two "snapshots" (i.e. accumulated data samples) of the same transmitted spectrum are taken (block 30). In order to determine the frequency offset $f_{offset}$, data samples from the second period x2 are correlated with the complex conjugate of the data samples of the first period x1 (block 31). Specifically, the dot product of the data samples of the second period x2 and the complex conjugate of the data samples of the first period x1 is calculated. A symbol correlated with itself will result in a positive real number. However, in the presence of frequency offset, the phase of the signal will vary between the first and second periods. This will result in the dot product producing a vector in the complex plane, wherein the phase component a of the vector is the frequency offset (phase difference over time equals frequency).

The sign of α is defined such that if the transmitter oscillation frequency is higher than the receiver oscillation frequency, α is positive. If $f_{offset}$ is not zero, then the transmitted signal spectrum will rotate from one symbol to another, as compared to the DC offset introduced at the receiver, by the amount of phase between the two symbols.

If N time-domain samples of the two symbols are separately accumulated from their respective first sample, and referred to as x1 and x2, then the DC offset can be calculated (block 32) as follows:

$$DC = \frac{x2 - x1 \times \exp(j\alpha)}{1 - \exp(j\alpha)} \bigg/ N \quad \text{(Eq. 1)}$$

This equation is therefore derived from the fact that the two accumulated sums of the samples from the two symbols only differ in their phase, which is the consequence of a non-zero $f_{offset}$. Since there are only two variables—the DC offset and the accumulated sum of the symbol with a known phase difference—the DC offset can be solved algorithmically using two equations (two snapshots of the same symbol), as shown in the above equation.

The inventive DC offset calculation method and system is particularly accurate where the frequency offset is large, so that $(1-\exp(j\alpha))$ will not be a very small number in the divider. If the frequency offset is actually very small, in which case $(1-\exp(j\alpha))$ will be close to zero, the inventive method and system may incur too much noise enhancement, in which case the inventive technique may be combined with the available filtering technique described above, as the transmitter carrier leak would overlap with the receiver DC offset and both of them can be eliminated by a simple averaging or filtering operation.

The proposed method and system is preferably extended to a more general treatment where the number of variables may be larger than two. As long as multiple snapshots of the same symbol can be attained, as is usually the case during a data training sequence (as provided by the IEEE 802.11a radio communications protocol) before real data are transmitted, this method can be used to extract DC offset or any other effect caused by either the transmitter or the receiver. This technique in general provides a "separation" strategy between the parameters of the receiver and those of the transmitter.

The present solution is derived from simply solving two simultaneous equations for two unknowns, i.e. carrier leak and DC offset. This method can be generalized to cases having more unknowns and more equations, such as having three measurements and adding a third unknown, the frequency offset. In the presence of noise, there are linear algebra techniques well known to those skilled in the art for solving over-determined systems, in which case three or more symbols could be used to estimate the two unknowns, and provide a valid DC offset estimate.

If there are four measurements, one solution is to sum the first two symbols to make x1, and the second two symbols to make x2. Then, the frequency component $\exp(j\alpha)$ is doubled, since the effective stride between the measurements is now twice as long. If three symbols are present, the first two symbols are summed to make x1, then the last two symbols are summed to make x2, and the $\exp(j\alpha)$ value is left unchanged. This is sub-optimal, since the middle symbol is given more weight, but for certain practical implementations it may be sufficient.

Figure 4:
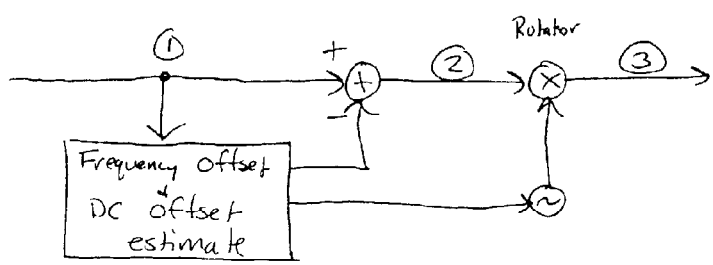
FIG. 4 is a block diagram of the operation of the present invention to reduce DC offset in a signal.
Figure 5:
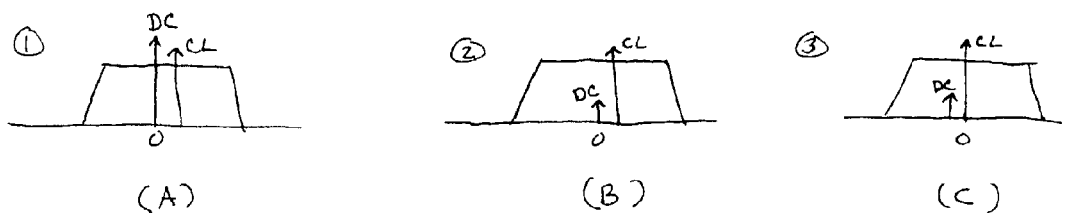
FIGS. 5(A)–5(C) are graphs illustrating the reduction in the DC offset according to the system of FIG. 4.

As shown in FIG. 4, the present invention determines the frequency offset $f_{offset}$ and DC offset, and uses these values to reduce the amount of DC offset. At position 1, the input signal contains both a DC offset signal and a carrier leak (CL) signal. This is shown graphically in FIG. 5(A). At position 2 the estimated DC offset, calculated according to the present invention, is removed, as shown graphically in FIG. 5(B). Note that only a residual DC offset signal is present. Finally, at position 3, the signal is shifted to remove the calculated $f_{offset}$, as shown in FIG. 5(C).

DC Offset Tracking

Figure 6:
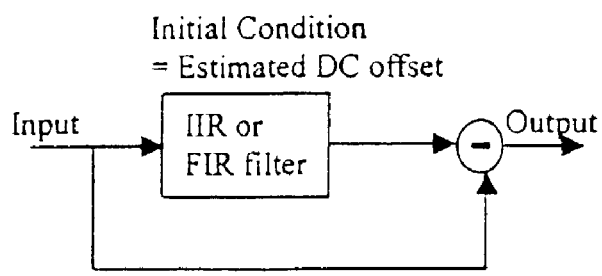
FIG. 6 illustrates the DC offset tracking circuit of the present invention.

If the DC offset changes over time during one packet transmission, a DC offset tracking circuit can be used to track slowly changing DC offset (block 33). Since the inventive DC offset system and method serves as an accurate initial condition, the tracking circuit can be implemented by either an infinite-impulse-response (IIR) filter or a finite-impulse-response filter (FIR), both of which use long-term average of the received signal to track the DC offset drift, as shown in FIG. 6. More particularly, if the input signal is X[n], then input signal may be "tracked" according to the following equation:

$Y[n]=(1/\alpha)X[n]+((\alpha-1)/\alpha)Y[n-1]$ \quad (Eq. 2)

where Y[n] is the estimated DC offset and adjustment value.

Figure 7:
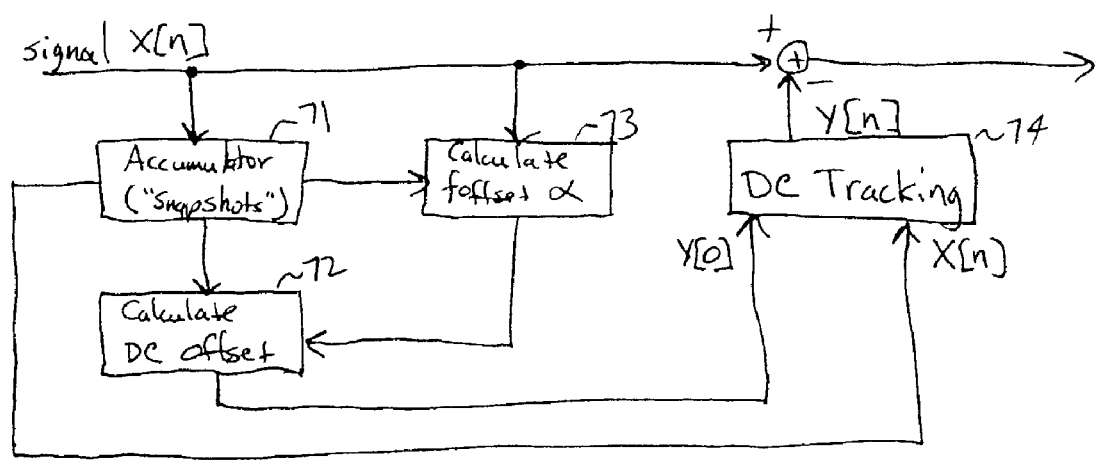
FIG. 7 is a block diagram of one embodiment of the present invention.

One embodiment of the present invention is illustrated in FIG. 7. In this figure, the input signal is stored in an accumulator 71, which stores a "snapshot" of at least two data sequences (symbols). In the preferred embodiment, up to four symbols can be stored in the accumulator, depending upon how may preamble symbols are remaining. From this data, the frequency offset α is calculated in block 73. Using the technique described above (Eq. 1), the DC offset is then calculated at block 72. The outputs of the DC offset block 72 and the accumulator block 71 are then applied to the DC tracking block 74, which implements the tracking equation above (Eq. 2). For slowly varying DC offsets, the present invention can thereby reduce the DC offset, even within a single packet transmission. Thus, the present invention provides an improved method and system for mitigating a DC offset signal in the presence of carrier frequency offsets.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for estimating the DC offset in a signal, the method comprising:
   receiving at least two identical data sequences;
   determining N time-domain samples for the at least two data sequences;
   calculating a phase difference α between the at least two data sequences; and
   calculating a DC offset estimate based upon the N time-domain samples and the phase difference α.

2. The method of claim 1, wherein each data sequence comprises a symbol.

3. The method of claim 1, wherein two data sequences are received: x1 during a first period, and x2 during a second period.

4. The method of claim 3, wherein the phase difference α is calculated by taking a dot product of the N time-domain samples of x2 with the complex conjugate of the N time-domain samples of x1.

5. The method of claim 4, wherein the DC offset is calculated according to the following formula:

$$DC = \frac{x2 - [x1 \times \exp(j\alpha)]}{N[1 - \exp(j\alpha)]}.$$

6. The method of claim 5, wherein the calculated DC offset is subtracted from the signal.

7. The method of claim 6, wherein the DC offset is tracked and subtracted from the signal.

8. The method of claim 5, wherein x1 is formed from at least two symbols, and x2 is formed from at least two symbols.

9. A DC offset adjustment circuit for removing a DC offset signal from a data signal, the circuit comprising:
   an accumulator for storing N time-domain samples of a first received data symbol and a second received data symbol, wherein the first data symbol and the second data symbol are identical;
   a phase difference calculation unit for calculating a phase difference α between the first and a second received data symbol;
   a DC offset calculation unit for calculating a DC offset based upon the N time domain samples and the phase difference α; and
   a subtraction unit for subtracting the DC offset from the data signal.

10. The circuit of claim 9, further comprising a DC tracking unit for tracking the variation in the DC offset signal within the data signal.

11. The circuit of claim 10, wherein the phase difference calculation unit calculates the phase difference α by taking a dot product of the N time-domain samples of the second received symbol with the complex conjugate of the N time-domain samples of the first received symbol.

12. The circuit of claim 11, wherein the DC offset calculation unit calculates the DC offset according to the formula:

$$DC = \frac{x2 - [x1 \times \exp(j\alpha)]}{N[1 - \exp(j\alpha)]}$$

where x1 is the first received signal, and x2 is the second received signal.

13. The circuit of claim 12, wherein x1 is formed from at least two symbols and x2 is formed from at least two symbols.

14. The circuit of claim 13, wherein the DC offset tracking unit comprises an FIR filter.

15. The circuit of claim 12, wherein the DC offset tracking unit comprises an IIR filter.

* * * * *